United States Patent
Fujita et al.

(10) Patent No.: US 10,523,330 B2
(45) Date of Patent: Dec. 31, 2019

(54) COMMUNICATION DEVICE, COMMUNICATION METHOD, AND COMMUNICATION SYSTEM

(71) Applicant: Sony Corporation, Tokyo (JP)

(72) Inventors: Hiroaki Fujita, Kanagawa (JP); Hiroaki Nakano, Tokyo (JP); Uichiro Omae, Kanagawa (JP); Tetsuya Fujiwara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/580,135

(22) PCT Filed: Jun. 17, 2016

(86) PCT No.: PCT/JP2016/068062
§ 371 (c)(1),
(2) Date: Dec. 6, 2017

(87) PCT Pub. No.: WO2017/010227
PCT Pub. Date: Jan. 19, 2017

(65) Prior Publication Data
US 2018/0145763 A1 May 24, 2018

(30) Foreign Application Priority Data
Jul. 10, 2015 (JP) .................... 2015-138445

(51) Int. Cl.
*H04B 10/556* (2013.01)
*H04W 52/08* (2009.01)
(Continued)

(52) U.S. Cl.
CPC ........ *H04B 10/5563* (2013.01); *H04W 52/08* (2013.01); *H04W 52/10* (2013.01); *H04W 52/42* (2013.01); *H04W 88/021* (2013.01)

(58) Field of Classification Search
CPC .... H04B 7/0413; H04B 7/10; H04B 10/5563; H04B 17/0082; H04B 1/59; H04B 1/7085;
(Continued)

(56) References Cited

U.S. PATENT DOCUMENTS 5,594,735 A * 1/1997 Jokura ................. H03L 7/10
370/337
8,401,092 B1 * 3/2013 Liu ................... H04L 7/0037
375/257

(Continued)

FOREIGN PATENT DOCUMENTS

JP 2009-175976 A 8/2009
JP 2011-254156 A 12/2011
(Continued)

*Primary Examiner* — Ajibola A Akinyemi
(74) *Attorney, Agent, or Firm* — Michael Best & Friedrich LLP

(57) ABSTRACT

A communication device of the disclosure includes a phase synchronizer, a modulator, and a controller. The phase synchronizer generates a second signal on a basis of a first signal received from a communication partner by selectively performing one of a closed loop operation and an open loop operation. The modulator is able to modulate the first signal on a basis of the second signal. The controller controls operations of the phase synchronizer and the modulator.

8 Claims, 15 Drawing Sheets

(51) Int. Cl.
  *H04W 52/10* (2009.01)
  *H04W 52/42* (2009.01)
  *H04W 88/02* (2009.01)

(58) Field of Classification Search
  CPC .. H04B 2001/0416; H04B 5/00; H04B 7/022;
   H04B 7/0617; H04B 7/2606
  USPC ........................................................ 455/103
  See application file for complete search history.

(56) References Cited

U.S. PATENT DOCUMENTS

| | | | | |
|---|---|---|---|---|
| 8,755,139 B1* | 6/2014 | Zou | ................. | G11B 5/746 360/51 |
| 2005/0077356 A1* | 4/2005 | Takayama | .......... | G06K 7/10237 235/451 |
| 2014/0218176 A1* | 8/2014 | Thueringer | ............ | G05B 13/02 340/10.5 |

FOREIGN PATENT DOCUMENTS

| JP | 2012-205137 A | 10/2012 |
|---|---|---|
| JP | 2013-062605 A | 4/2013 |

\* cited by examiner

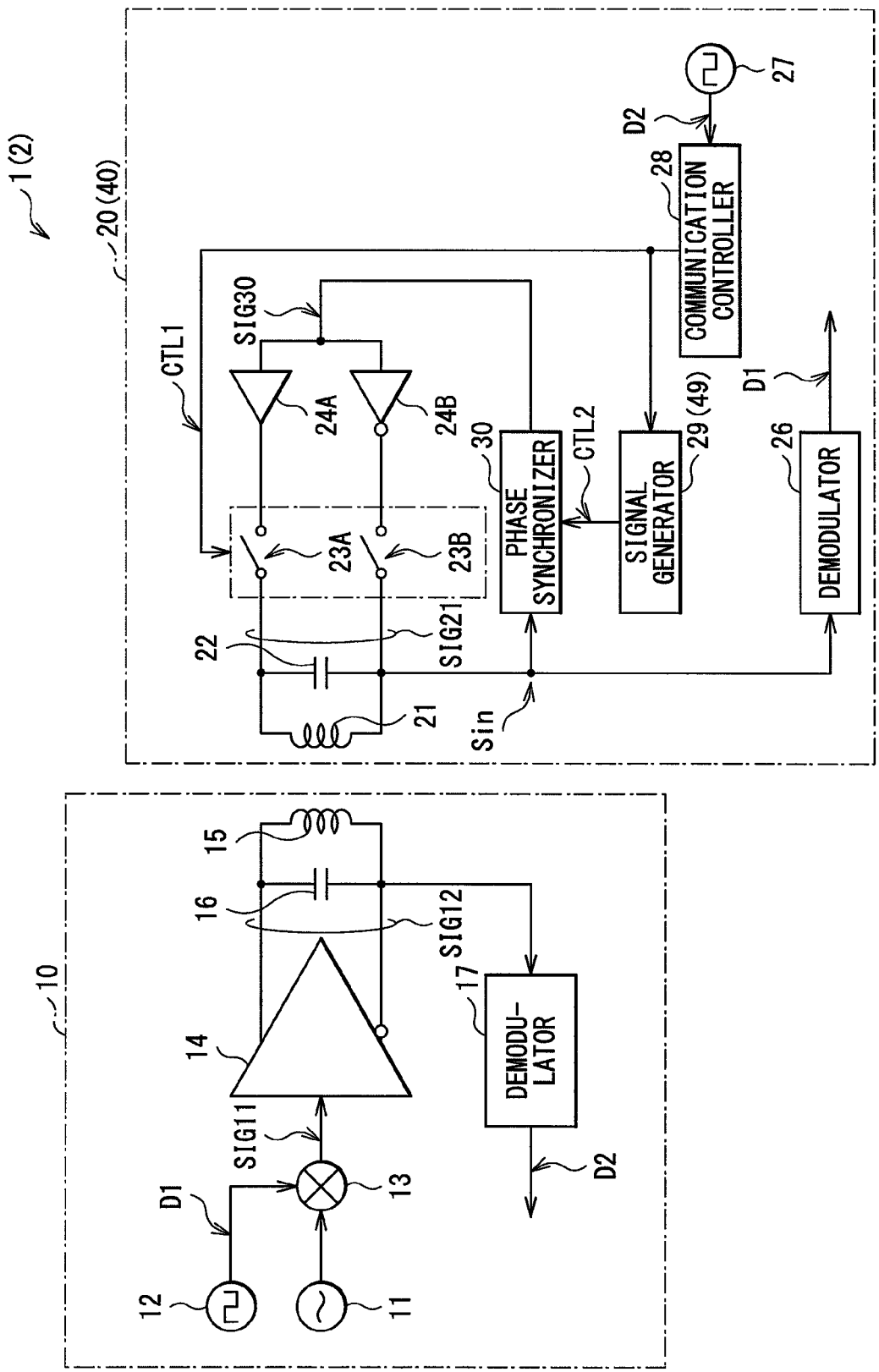
[FIG. 1]

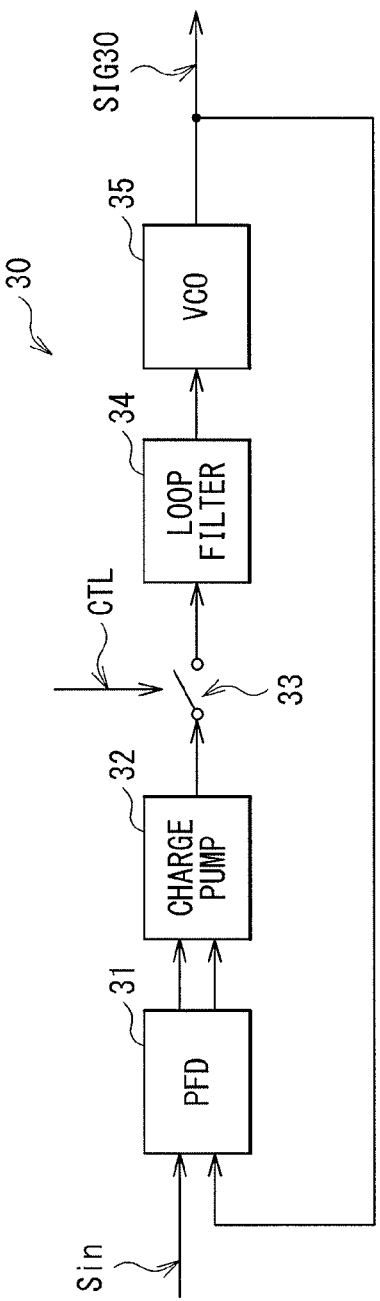
[ FIG. 2 ]

[ FIG. 3 ]
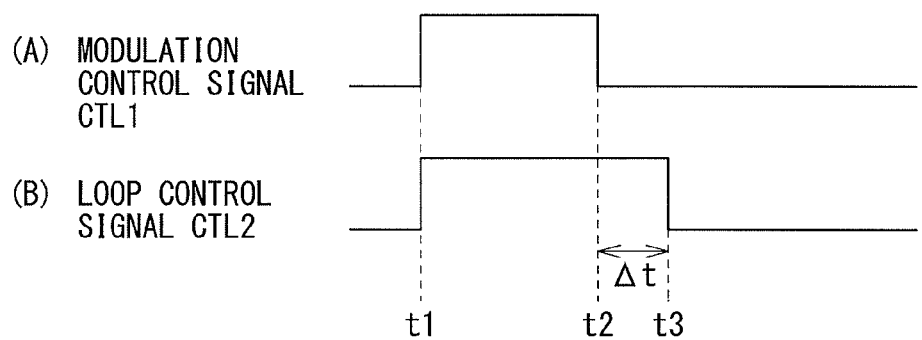
[ FIG. 4 ]
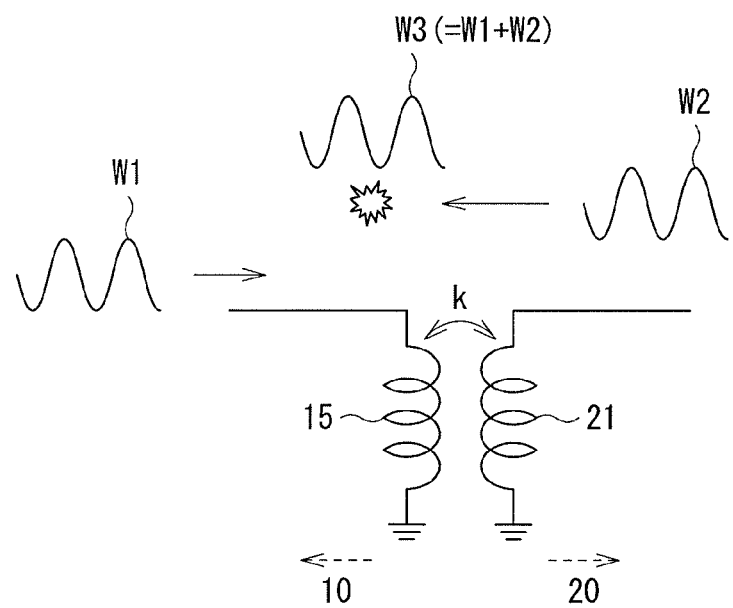

[FIG. 5]
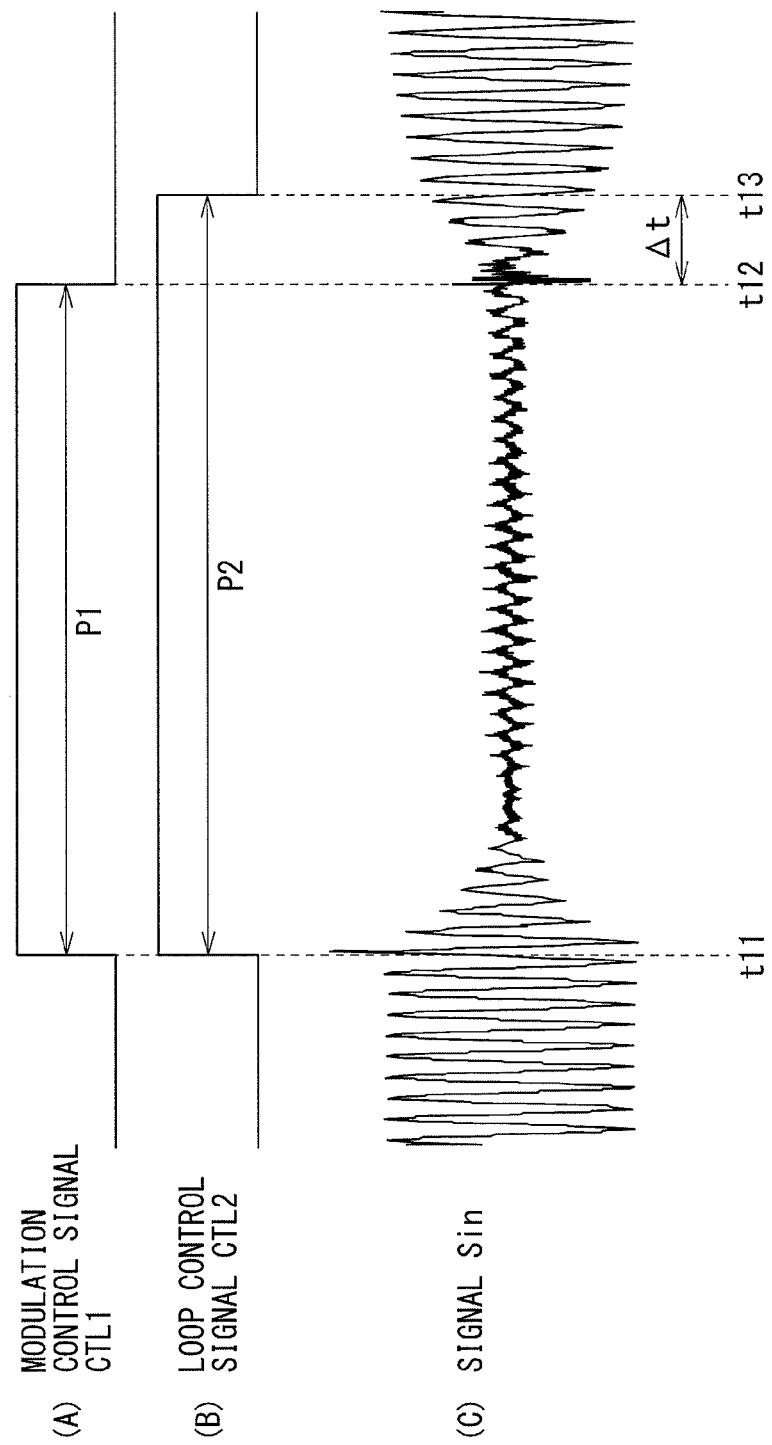

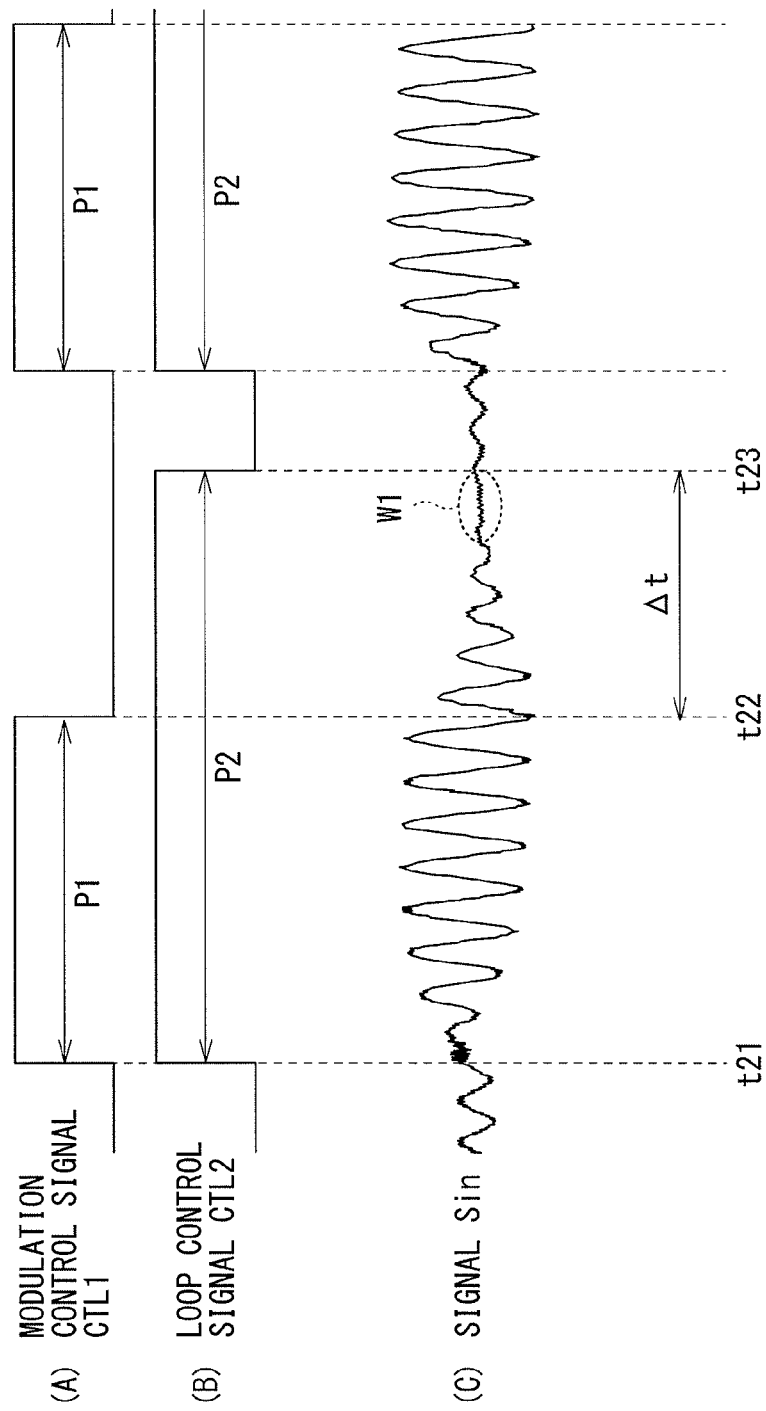
[FIG. 6]

[ FIG. 7 ]
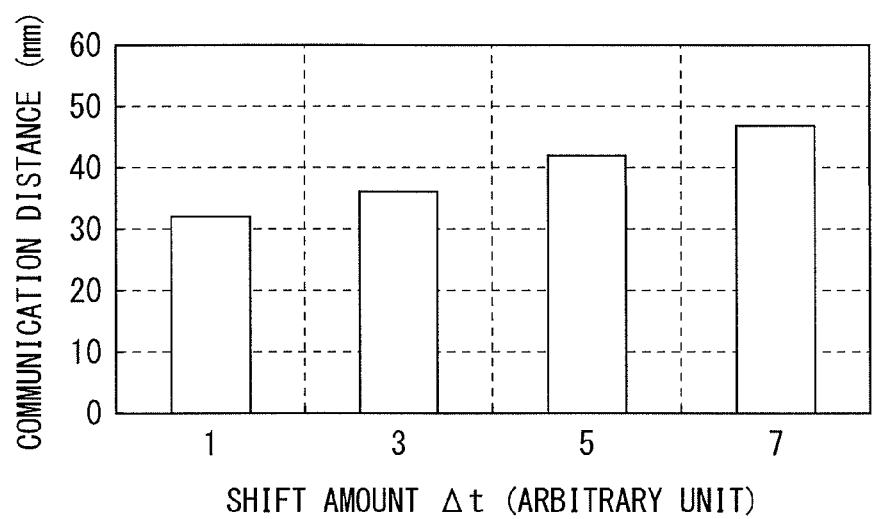

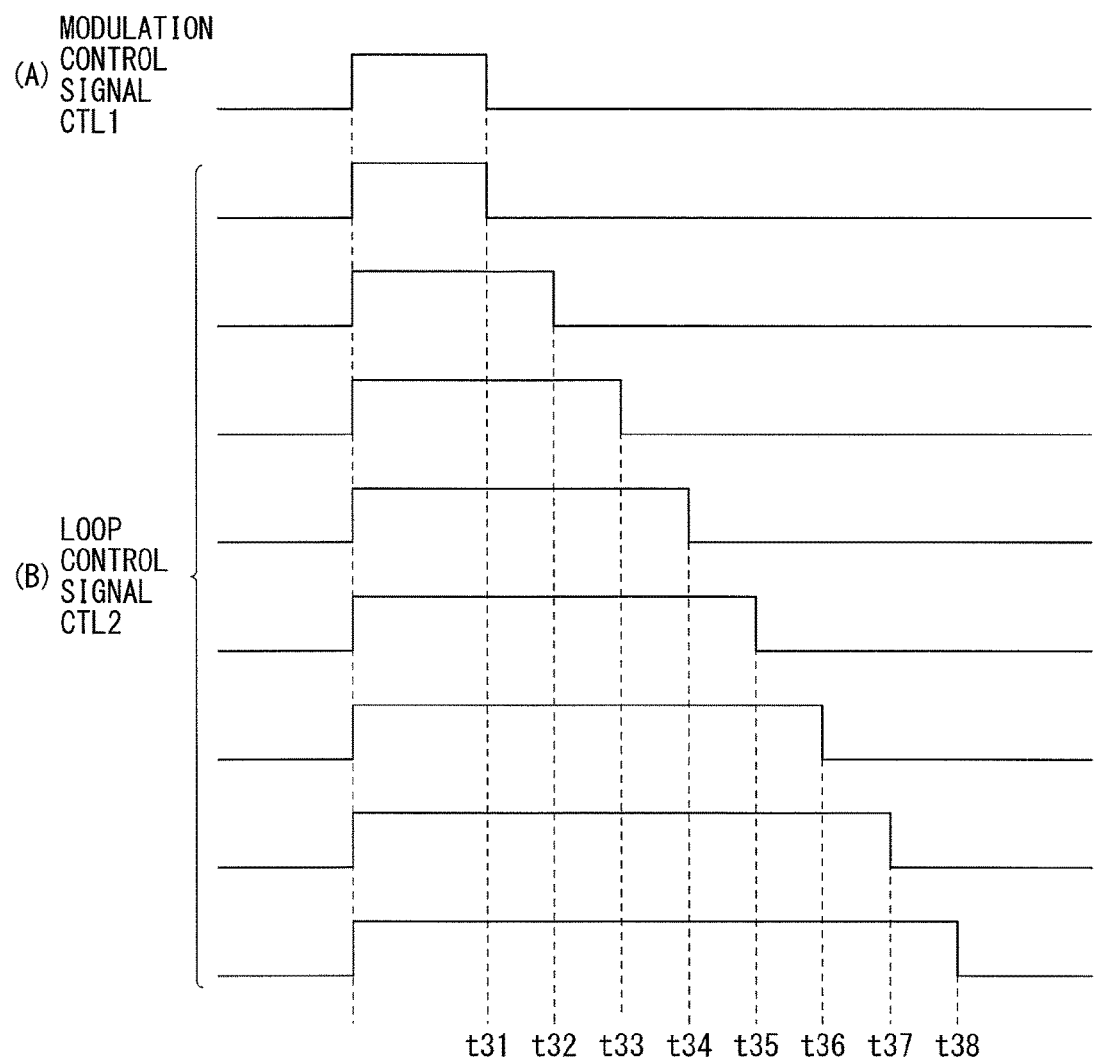

[FIG. 9]
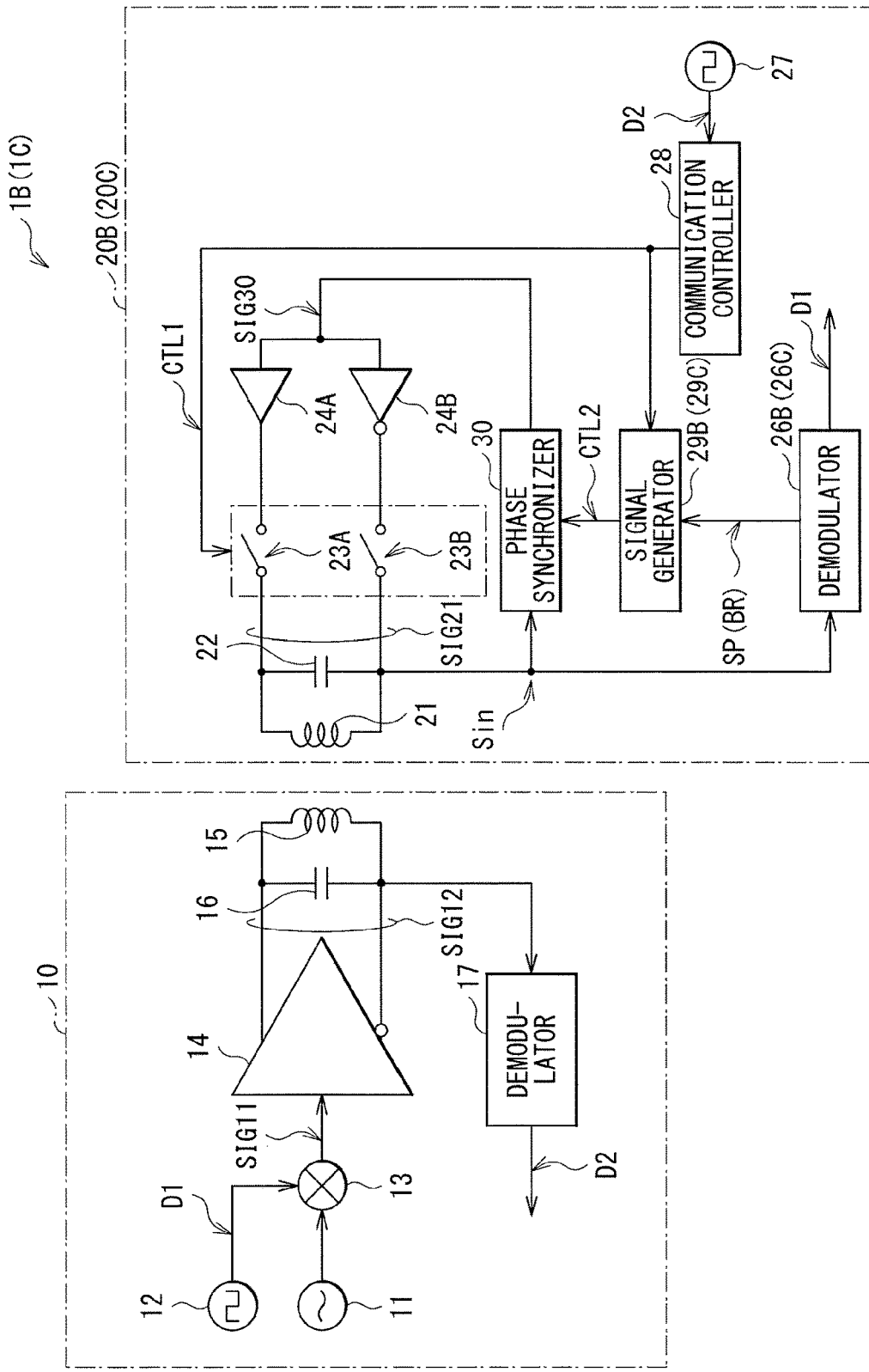

[ FIG. 10 ]
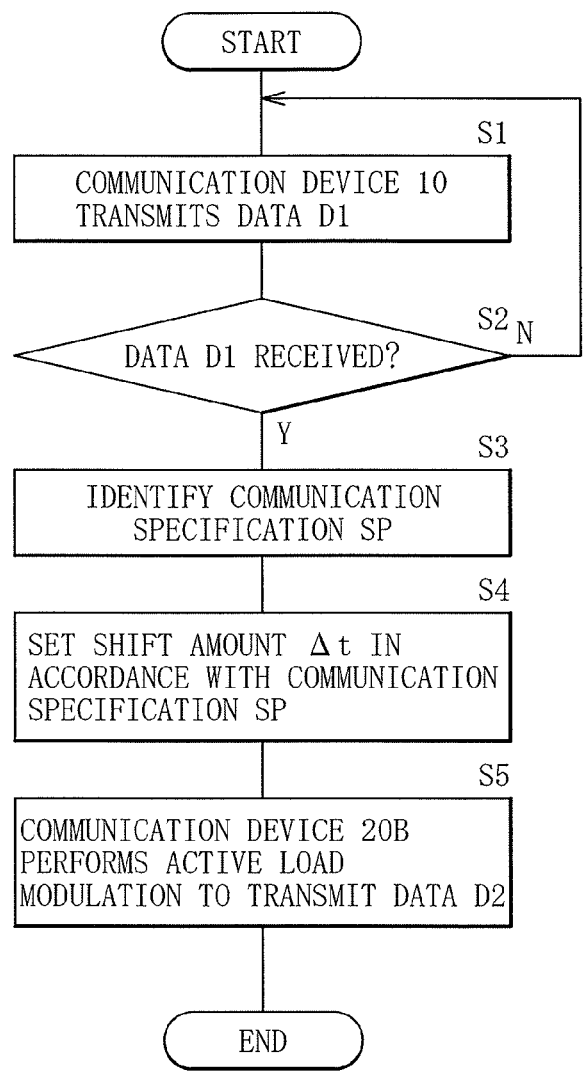

[ FIG. 11 ]
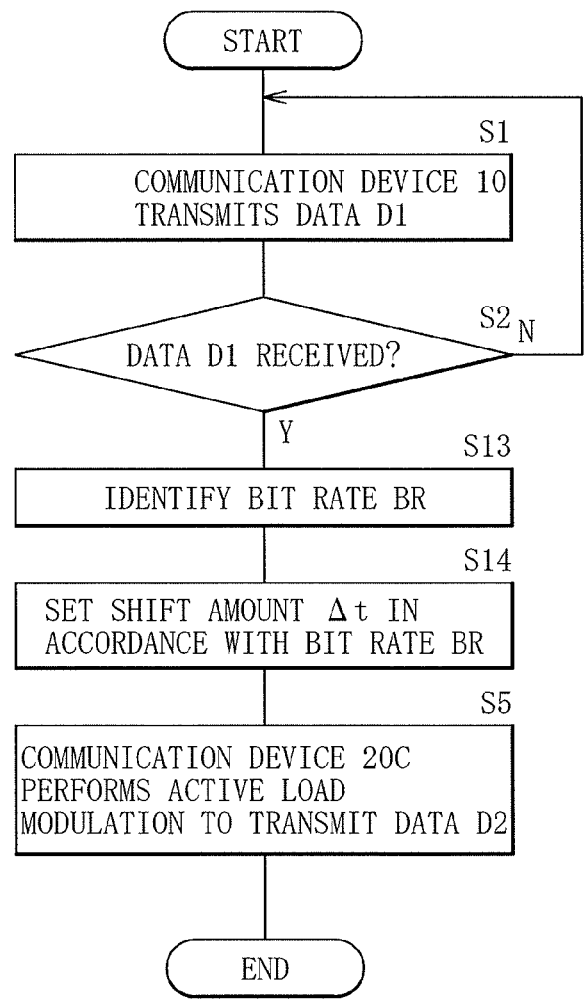

[ FIG. 12 ]
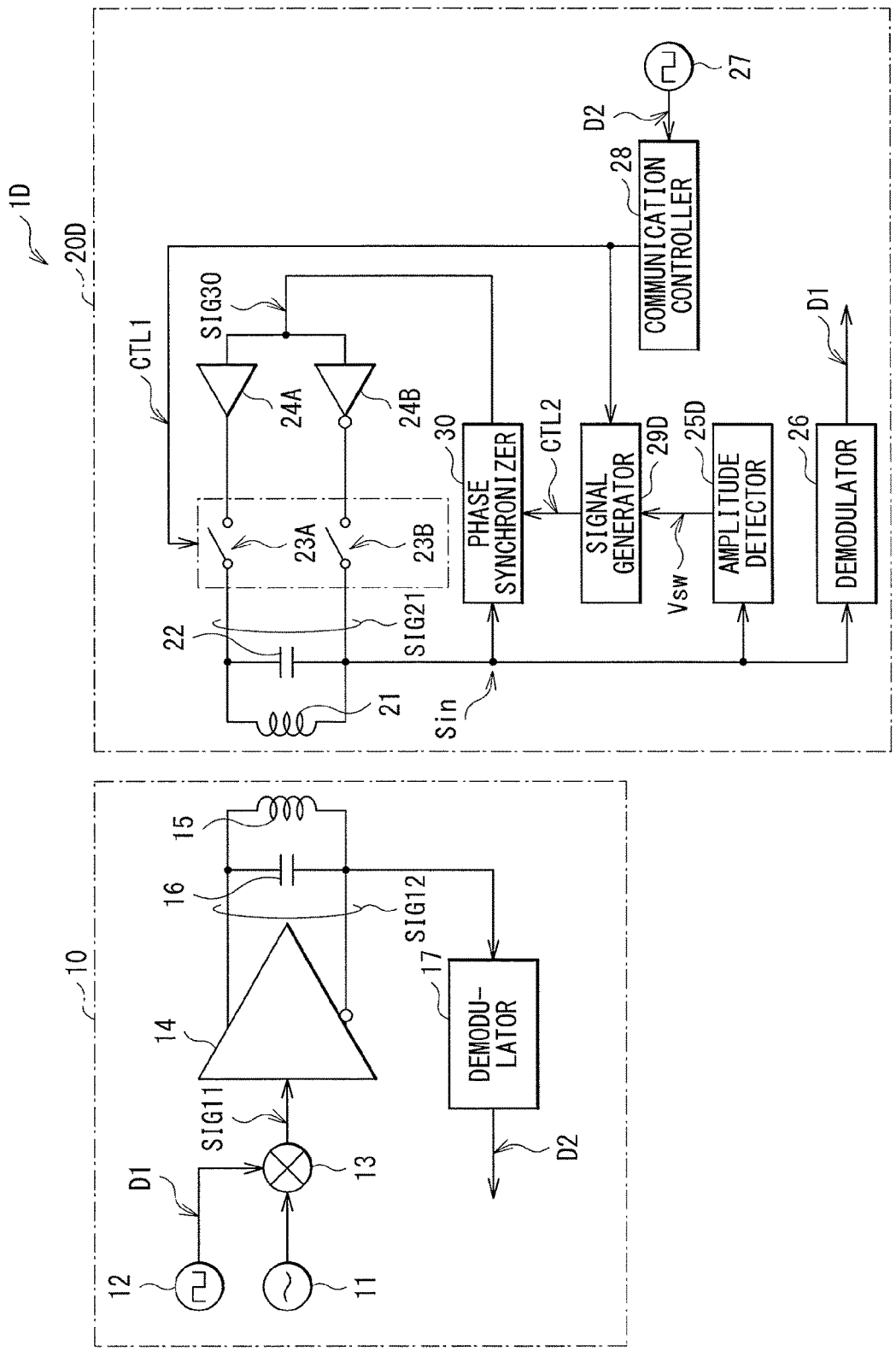

[ FIG. 13 ]
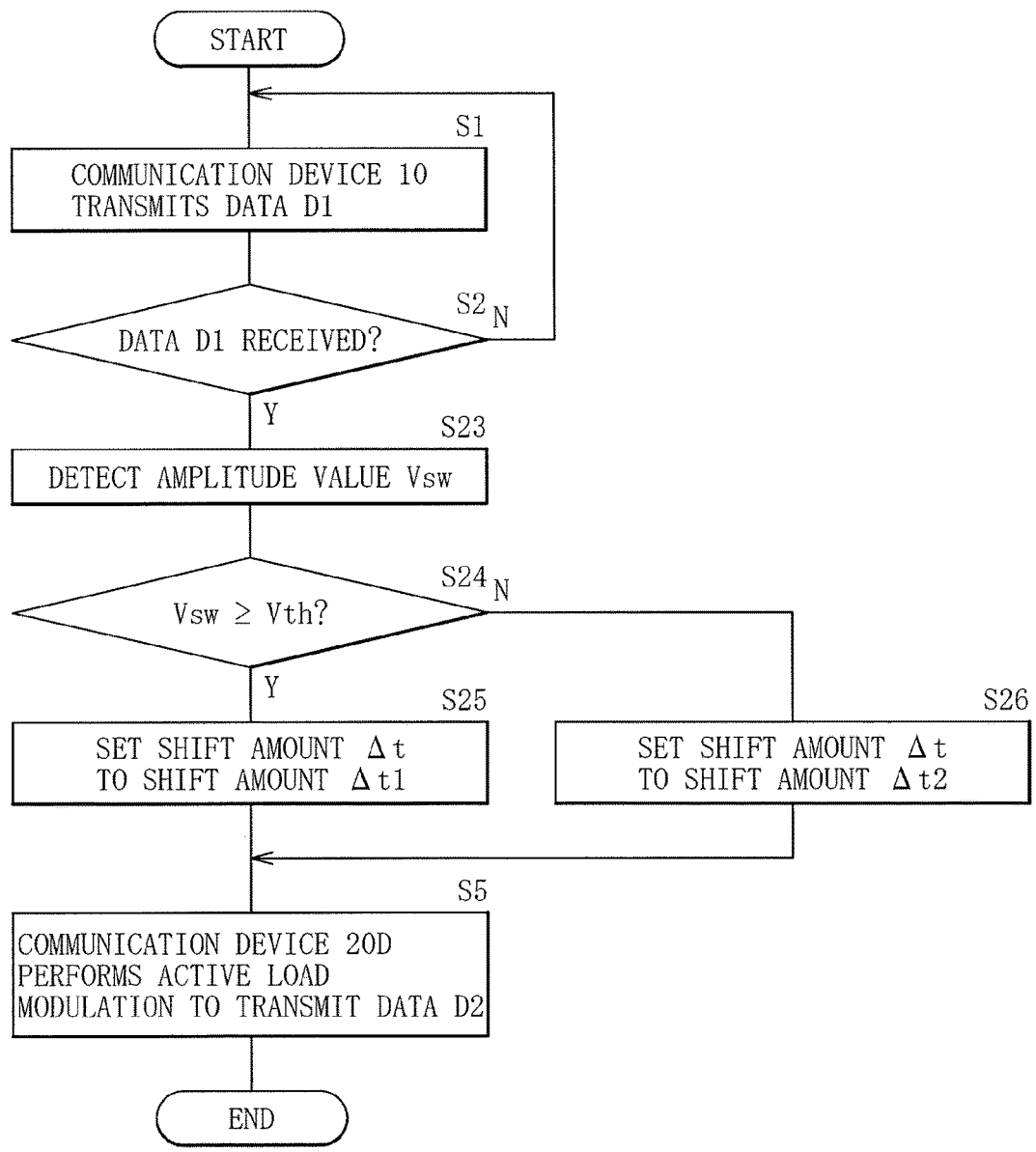

[ FIG. 14 ]
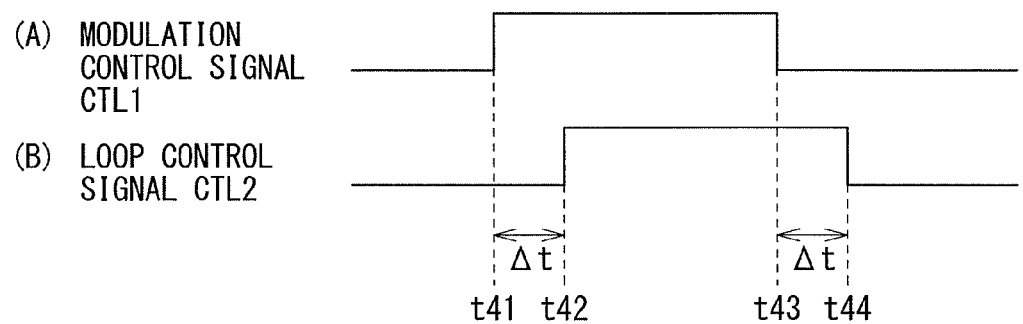

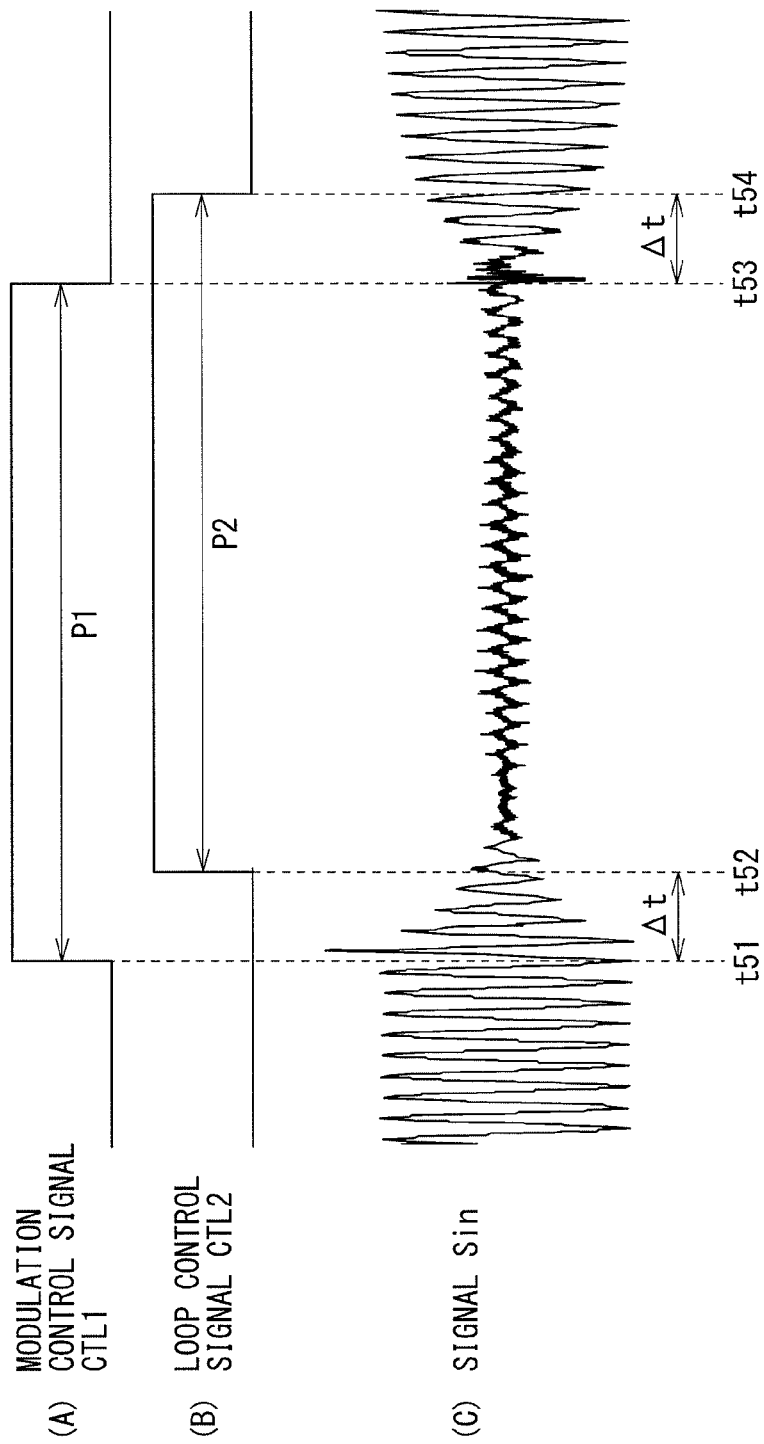
[FIG. 15]

[ FIG. 16 ]
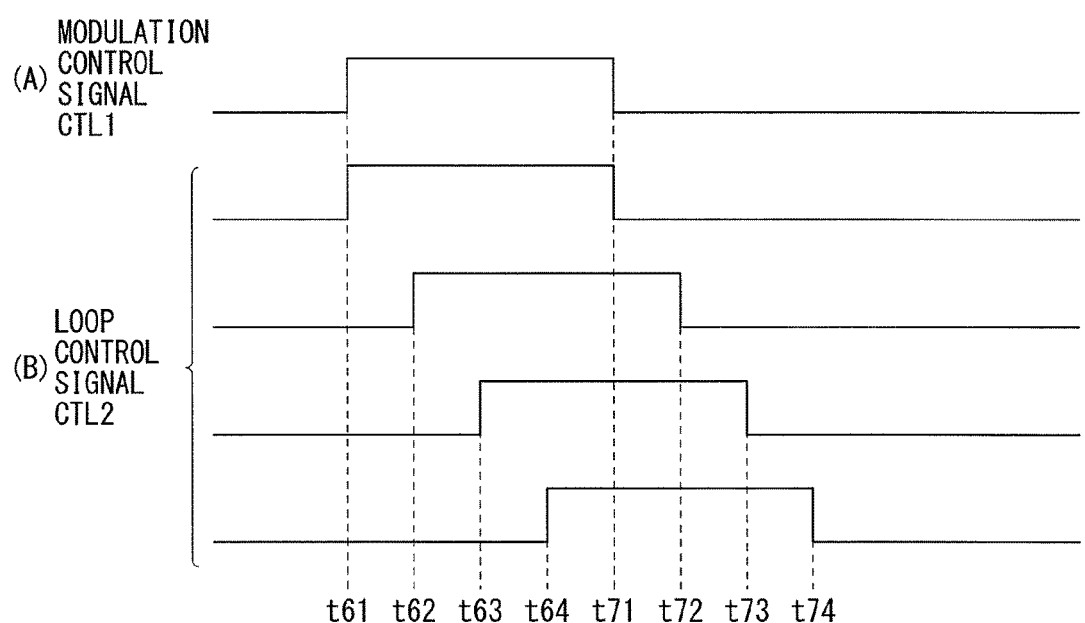

COMMUNICATION DEVICE, COMMUNICATION METHOD, AND COMMUNICATION SYSTEM

TECHNICAL FIELD

The disclosure relates to: a communication device used for near field communication (NFC); a communication method used for such a communication device; and a communication system including such a communication device.

BACKGROUND ART

NFC is a technique increasingly used mainly in Asian areas in the fields of traffic systems, accounting, and certification, for example. This technique has been approved as an international standard. The specification for the NFC, which is also referred to below as the NFC specification, has compatibility, i.e., so-called upward compatibility, for example, with various other specifications, such as Type A, Type B, FeliCa (registered trademark), and ISO15693 specifications. In other words, when a reader-writer or a card is compatible with the NFC specification, it is also compatible with all of those specifications.

In the NFC, as an example, a reader-writer subjects data to an amplitude shift keying (ASK) modulation and then transmits this data to a card. In turn, the card subjects data to a load modulation and then transmits this data to the reader-writer. PTLs 1 and 2 disclose examples of a communication device that is able to conduct communication using a load modulation, specifically, a passive load modulation.

On the other hand, some electronic circuits use phase locked loop (PLL) circuits, as disclosed in PTL 3, for example.

CITATION LIST

Patent Literature

PTL 1: Japanese Unexamined Patent Application Publication No. 2013-62605
PTL 2: Japanese Unexamined Patent Application Publication No. 2011-254156
PTL 3: Japanese Unexamined Patent Application Publication No. 2012-205137

SUMMARY OF THE INVENTION

In general, communications of enhanced qualities are demanded. Further improvements in communication qualities are expected.

It is desirable to provide a communication device, a communication method, and a communication system that make it possible to enhance a communication quality.

A communication device according to an embodiment of the disclosure includes a phase synchronizer, a modulator, and a controller. The phase synchronizer generates a second signal on a basis of a first signal received from a communication partner by selectively performing one of a closed loop operation and an open loop operation. The modulator is able to modulate the first signal on a basis of the second signal. The controller controls operations of the phase synchronizer and the modulator.

A communication method according to an embodiment of the disclosure includes: causing a phase synchronizer to selectively perform one of a closed loop operation and an open loop operation to generate a second signal on a basis of a first signal received from a communication partner; and causing a modulator to modulate the first signal on a basis of the second signal.

A communication system according to an embodiment of the disclosure includes a first communication device and a second communication device. The first communication device transmits a first signal. The second communication device includes a phase synchronizer, a modulator, and a controller. The phase synchronizer generates a second signal on a basis of the first signal received from the first communication device by selectively performing one of a closed loop operation and an open loop operation. The modulator is able to modulate the first signal on a basis of the second signal. The controller controls operations of the phase synchronizer and the modulator.

In the communication device, the communication method, and the communication system according to respective embodiments of the disclosure, the phase synchronizer generates the second signal on the basis of the first signal received from the communication partner. The first signal is modulated on the basis of this second signal. The above phase synchronizer selectively performs one of the closed loop operation and the open loop operation.

In the communication device, the communication method, and the communication system according to the respective embodiments of the disclosure, the phase synchronizer selectively performs one of the closed loop operation and the open loop operation, thereby making it possible to enhance a communication quality. It is to be noted that the effects described here are not necessarily limited thereto, and may be any of effects described in the disclosure.

BRIEF DESCRIPTION OF DRAWINGS

FIG. 1 is a block diagram illustrating an example of a configuration of a communication system according to an embodiment of the disclosure.

FIG. 2 is a block diagram illustrating an example of a configuration of a phase synchronizer illustrated in FIG. 1.

FIG. 3 is a timing waveform diagram illustrating an example of an operation of a signal generator according to a first embodiment.

FIG. 4 is an explanatory schematic diagram of a concept of an active load modulation.

FIG. 5 is a timing waveform diagram illustrating an example of an operation of a communication system according to a first embodiment.

FIG. 6 is a timing waveform diagram illustrating another example of the operation of the communication system according to the first embodiment.

FIG. 7 is a characteristic diagram illustrating an example of a characteristic of the communication system illustrated in FIG. 1.

FIG. 8 is a timing waveform diagram illustrating an example of an operation of a signal generator according to a modification example of the first embodiment.

FIG. 9 is a block diagram illustrating an example of a configuration of a communication system according to another modification example of the first embodiment.

FIG. 10 is a flowchart of an example of an operation of a communication system according to another modification example of the first embodiment.

FIG. 11 is a flowchart of an example of an operation of a communication system according to another modification example of the first embodiment.

FIG. 12 is a block diagram illustrating an example of a configuration of a communication system according to another modification example of the first embodiment.

FIG. 13 is a flowchart of an example of an operation of a communication system according to another modification example of the first embodiment.

FIG. 14 is a waveform diagram illustrating an example of an operation of a signal generator according to a second embodiment.

FIG. 15 is a timing waveform diagram illustrating an example of an operation of a communication system according to the second embodiment.

FIG. 16 is a timing waveform diagram illustrating an example of an operation of a signal generator according to a modification example of the second embodiment.

MODES FOR CARRYING OUT THE INVENTION

Some embodiments of the disclosure are described below in detail with reference to the accompanying drawings. The description is given in the following order.
1. First Embodiment
2. Second Embodiment
<1. First Embodiment>
<Configuration Example>

FIG. 1 illustrates an example of a configuration of a communication system 1 including communication devices according to a first embodiment. The communication system 1 conducts communication in accordance with the near field communication. It is to be noted that a communication method according to an embodiment of the disclosure is also embodied by the present embodiment, and thus is described together. The communication system 1 includes a communication device 10 and a communication device 20.

The communication device 10 and the communication device 20 communicate with each other through a magnetic field. In the communication system 1, specifically, a coil 15 in the communication device 10 is coupled to a coil 21 in the communication device 20 through a magnetic field, thereby transmitting or receiving data by means of electromagnetic induction. The coils 15 and 21 are described later. In this situation, the communication device 10 transmits data to the communication device 20 by means of an ASK modulation, and the communication device 20 transmits data to the communication device 10 by means of a so-called active load modulation. The communication device 10 is applicable to reader-writers, for example, and may be compatible with one of various specifications, including Type A, Type B, FeliCa, and ISO15693 specifications. The communication device 20 is applicable to cards, for example, and may be compatible with the NFC specification, which has upward compatibility with those specifications.

The communication device 10 includes a carrier signal generator 11, a data generator 12, a modulator 13, an amplifier 14, a coil 15, a capacitor 16, and a demodulator 17.

The carrier signal generator 11 generates a carrier signal. The carrier signal may have a frequency of about 13.56 MHz, for example. The data generator 12 generates data D1 to be transmitted.

The modulator 13 ASK-modulates the carrier signal by using the data D1, thereby generating a signal SIG11.

The amplifier 14 generates a signal SIG12 on the basis of the signal SIG11, and then outputs this signal SIG12 as an inter-terminal signal between a first output terminal and a second output terminal. A first output terminal of the amplifier 14 is coupled to a first end of the coil 15 and to a first end of the capacitor 16. A second output terminal of the amplifier 14 is coupled to a second end of the coil 15 and to a second end of the capacitor 16.

The coil 15 generates a magnetic field on the basis of the signal SIG12 and is to be coupled to the coil 21, described later, in the communication device 20 through the magnetic field. The first end of the coil 15 is coupled to both the first output terminal of the amplifier 14 and the first end of the capacitor 16. The second terminal of the coil 15 is coupled to both the second output terminal of the amplifier 14 and the second end of the capacitor 16. The first end of the capacitor 16 is coupled to both the first end of the coil 15 and the first output terminal of the amplifier 14. The second end of the capacitor 16 is coupled to both the second end of the coil 15 and the second output terminal of the amplifier 14.

The demodulator 17 performs a demodulation operation on the basis of a signal at the second end of the coil 15, thereby receiving data D2 transmitted from the communication device 20. The demodulator 17 may be configured using a so-called in-phase/quadrature (I/Q) demodulator, for example. In the communication system 1, the communication device 20 conducts communication by means of a load modulation when transmitting data to the communication device 10. Specifically, during the period in which the communication device 10 transmits the carrier signal to the communication device 20, a communication controller 28, described later, in the communication device 20 varies a load viewed from the communication device 10 in accordance with the data D2 to be transmitted. This variation in the load emerges, for example, as a variation in an amplitude or phase of a voltage signal at the second end of the coil 15 in the communication device 10. The demodulator 17 detects the amplitude or phase of the voltage signal at the second end of the coil 15, thereby receiving the data D2 transmitted from the communication device 20. Then, the demodulator 17 supplies the data D2 to another block in the communication device 10.

In this example, the demodulator 17 operates on the basis of the signal at the second end of the coil 15; however, the operation of the demodulator 17 is not limited thereto. As an alternative example, the demodulator 17 may operate on the basis of a signal at the first end of the coil 15 or on the basis of a signal across the coil 15.

The communication device 20 includes the coil 21, a capacitor 22, a phase synchronizer 30, amplifiers 24A and 24B, switches 23A and 23B, a data generator 27, the communication controller 28, a signal generator 29, and a demodulator 26.

The coil 21 is to be coupled to the coil 15 in the communication device 10 through the magnetic field. The coil 21 generates a signal SIG21 corresponding to the signal SIG12 in the communication device 10, by means of electromagnetic induction. A first end of the coil 21 is coupled to both a first end of the capacitor 22 and a first end of the switch 23A, whereas a second end of the coil 21 is coupled to both a second end of the capacitor 22 and a first end of the switch 23B. The first end of the capacitor 22 is coupled to both the first end of the coil 21 and the first end of the switch 23A, whereas the second end of the capacitor 22 is coupled to both the second end of the coil 21 and a first end of the switch 23B.

The phase synchronizer 30 generates a signal SIG30 on the basis of a signal Sin at the second end of the coil 21. The phase synchronizer 30 is configured using a phase locked loop (PLL).

FIG. 2 illustrates an example of a configuration of the phase synchronizer 30. The phase synchronizer 30 includes a phase frequency detector (PFD) 31, a charge pump 32, a switch 33, a loop filter 34, and a voltage controlled oscillator (VCO) 35.

The PFD 31 compares a phase of the signal Sin and a phase of the signal SIG30 outputted from the VCO 35 with each other. The charge pump 32 selectively supplies a current to the loop filter 34 or sinks current from the loop filter 34 on the basis of a comparison result from the PFD 31. An output terminal of the charge pump 32 is coupled to an input terminal of the loop filter 34 via the switch 33. When the switch 33 is brought into an ON state, the output terminal of the charge pump 32 and the input terminal of the loop filter 34 are coupled to each other. The switch 33 turns on or off on the basis of a loop control signal CT2. The loop filter 34 specifies a loop response characteristic of the phase synchronizer 30. The input terminal of the loop filter 34 is coupled to the output terminal of the charge pump 32 via the switch 33, whereas the output terminal of the loop filter 34 is coupled to an input terminal of the VCO 35. The VCO 35 oscillates at a frequency corresponding to an output voltage of the loop filter 34, thereby generating the signal SIG30.

With the above configuration, the phase synchronizer 30 generates the signal SIG30 on the basis of the signal Sin. In this situation, the phase synchronizer 30 is able to selectively perform an open loop operation or a closed loop operation on the basis of a loop control signal CTL2.

The amplifier 24A, illustrated in FIG. 1, amplifies the signal SIG30, and then outputs the amplified signal. The amplifier 24B inverts and amplifies the signal SIG30, and then outputs the inverted amplified signal.

The first end of the switch 23A is coupled to both the first end of the coil 21 and the first end of the capacitor 22, whereas a second end of the switch 23A is coupled to an output terminal of the amplifier 24A. The first end of the switch 23B is coupled to both the second end of the coil 21 and the second end of the capacitor 22, whereas a second end of the switch 23B is coupled to an output terminal of the amplifier 24B. Each of the switches 23A and 23B turns on or off on the basis of a modulation control signal CTL1.

With the above configuration, the communication device 20 turns on or off the switches 23A and 23B on the basis of the modulation control signal CTL1, thereby performing the active load modulation.

The data generator 27 generates the data D2 to be transmitted, and then supplies the data D2 to the communication controller 28. The communication controller 28 generates the modulation control signal CTL1 on the basis of the data D2. Then, the communication controller 28 supplies the modulation control signal CTL1 to the switches 23A and 23B as well as to the signal generator 29.

The signal generator 29 generates the loop control signal CTL2 on the basis of the modulation control signal CTL1, and then supplies this loop control signal CTL2 to the phase synchronizer 30.

FIG. 3 illustrates an example of an operation of the signal generator 29. (A) of FIG. 3 illustrates a waveform of the modulation control signal CTL1, and (B) of FIG. 3 illustrates a waveform of the loop control signal CTL2. In this example, the switches 23A and 23B are in an OFF state during the period in which the modulation control signal CTL1 is at a Low level, and are in an ON state during the period in which the modulation control signal CTL1 is at a High level. Further, the phase synchronizer 30 performs a closed loop operation during the period in which the loop control signal CTL2 is at a Low level, and performs the open loop operation during the period in which the loop control signal CTL2 is at a High level.

When the modulation control signal CTL1 rises at timing t1, the signal generator 29 changes, in response to this rise, the loop control signal CTL2 from the Low level to the High level. When the modulation control signal CTL1 falls at timing t2, the signal generator 29 changes, in response to this fall, the loop control signal CTL2 from the High level to the Low level, at timing t3 that is delayed from timing t2 by a predetermined time. In short, the signal generator 29 delays the falling timing of the modulation control signal CTL1 by a shift amount Δt, thereby generating the loop control signal CTL2 with its pulse width being greater than that of the modulation control signal CTL1. The phase synchronizer 30 thereby performs the open loop operation over the period, i.e., the period between timing t1 and t3, which corresponds to the period between timing t1 and t2 in which the switches 23A and 23B are in the ON state.

In this example, the rising timing of the modulation control signal CTL1 and the rising timing of the loop control signal CTL2 are the same as each other; however, the rising timings of the modulation control signal CTL1 and the loop control signal CTL2 are not limited thereto. As an alternative example, the rising timing of the loop control signal CTL2 may be delayed from the rising timing of the modulation control signal CTL1 by the delay time of the circuit. As another alternative example, in a case where the signal generator 29 is configured to operate on the basis of an unillustrated clock signal, the rising timing of the loop control signal CTL2 may be delayed from the rising timing of the modulation control signal CTL1 by time necessary for an operation of the circuit, such as a setup time.

The demodulator 26, illustrated in FIG. 1, performs a demodulation operation on the basis of the signal Sin at the second end of the coil 21, thereby receiving the data D1 transmitted from the communication device 10. The demodulator 26 is configured using an ASK demodulator. Then, the demodulator 26 supplies the data D1 to another block in the communication device 20.

In this example, the phase synchronizer 30 and the demodulator 26 operate on the basis of the signal Sin at the second end of the coil 21; however, the operations of the phase synchronizer 30 and the demodulator 26 are not limited thereto. As an alternative example, the phase synchronizer 30 and the demodulator 26 may operate on the basis of the signal at the first end of the coil 21 or on the basis of the signal across the coil 21.

Herein, the communication device 20 may correspond to a specific example of a "communication device" in an embodiment of the disclosure. The amplifiers 24A and 24B and the switches 23A and 23B may correspond to a specific example of a "modulator" in an embodiment of the disclosure. The communication controller 28 and the signal generator 29 may correspond to a specific example of a "controller" in an embodiment of the disclosure.

[Operation and Workings]

Next, a description is given of an operation and workings of the communication system 1 in the present embodiment.

[Summary of Overall Operation]

First, the summary of an overall operation of the communication system 1 is described with reference to FIG. 1.

The communication device 10 performs the ASK modulation to transmit the data D1 to the communication device 20. Specifically, in the communication device 10, first, the carrier signal generator 11 generates the carrier signal, and the data generator 12 generates the data D1 to be transmitted. The modulator 13 ASK-modulates the carrier signal by using the data D1, thereby generating the signal SIG11. The amplifier 14 generates the signal SIG12 on the basis of the signal SIG11. The coil 15 generates a magnetic field on the basis of the signal SIG12. In the communication device 20, the coil 21 generates the signal SIG21 on the basis of the magnetic field generated by the coil 15. The demodulator 26 performs the demodulation operation on the basis of the signal Sin at the second end of the coil 21, thereby receiving the data D1 transmitted from the communication device 10.

The communication device 20 performs the active load modulation to transmit the data D2 to the communication device 10. Specifically, first, the communication controller 28 generates the modulation control signal CTL1 on the basis of the data D2 during the period in which the communication device 10 transmits the carrier signal to the communication device 20. Then, the signal generator 29 generates the loop control signal CTL2 on the basis of the modulation control signal CTL1. The phase synchronizer 30 selectively performs the open loop operation or the closed loop operation on the basis of the loop control signal CTL2, and generates the signal SIG30 on the basis of the signal Sin. The amplifier 24A amplifies the signal SIG30 outputted from the phase synchronizer 30, and then outputs the amplified signal. The amplifier 24B inverts and amplifies the signal SIG30 outputted from the phase synchronizer 30, and then outputs the inverted amplified signal. Each of the switches 23A and 23B turns on or off on the basis of the modulation control signal CTL1. This causes the load viewed from the communication device 10 to vary on the basis of the data D2. The demodulator 17 in the communication device 10 performs the demodulation operation on the basis of the signal at the second end of the coil 15, thereby receiving the data D2 transmitted from the communication device 20.

(Concerning Active Load Modulation)

The communication device 20 performs a so-called active load modulation to transmit the data D2 to the communication device 10. Details of this active load modulation are described below.

In the active load modulation, the communication controller 28 turns on or off the switches 23A and 23B in accordance with the data D2 during the period in which the communication device 10 transmits the carrier signal to the communication device 20. When both the switches 23A and 23B are in the ON state, the signal outputted from the amplifier 24A is supplied to the first end of the coil 21, and the signal outputted from the amplifier 24B is supplied to the second end of the coil 21. The coil 21 thereby generates the magnetic field. In this way, in the active load modulation, the coil 21 in the communication device 20 generates the magnetic field during the period in which the communication device 10 transmits the carrier signal to the communication device 20, thereby enabling the magnetic field to be greatly varied, thus making it possible to vary the load viewed from the communication device 10. On the basis of the varied load, the demodulator 17 in the communication device 10 performs the demodulation operation, thereby receiving the data D2 transmitted from the communication device 20. Consequently, for example, in the communication system 1, it is possible to increase a communication distance or to downsize antennas, such as the coils 15 and 21.

FIG. 3 schematically illustrates an operation in the active load modulation. The coil 15 in the communication device 10 generates a magnetic field on the basis of a carrier signal W1. The coil 21 in the communication device 20 generates a magnetic field on the basis of a signal W2 that is synchronized with the carrier signal, during the period in which the switches 23A and 23B are in the ON state. Then, the demodulator 17 in the communication device 10 performs the demodulation operation on the basis of a synthesized signal W3 generated from the carrier signal W1 and the signal W2. This synthesized signal W3 is expressed as follows:

$$A\sin(\omega t)+B\sin(\omega t+\theta)=\sqrt{A^2+B^2+2AB\cos\theta}\sin(\theta+\phi) \qquad (1)$$

where the first term in the left side expresses the carrier signal W1, and the second term in the left side expresses the signal W2. In this way, the synthesized signal W3 is expressed by a composition theorem of sinusoidal waves. The amplitude of the synthesized signal W3 varies depending on an amplitude A of the carrier signal W1 and an amplitude B and phase θ of the signal W2. Accordingly, in some situations, the amplitude of the synthesized signal W3 may become extremely low. In such situations, the amplitude of the signal Sin at the second end of the coil 21 in the communication device 20 may also become low. The communication device 20 controls the phase synchronizer 30 to perform the open loop operation during a period, i.e., an open loop operation period P2, as described later, corresponding to a period of the active load modulation, i.e., a modulation period P1 as described later. This reduces the possibility of the phase synchronizer 30 in the communication device 20 malfunctioning even in a case where the amplitude of the signal Sin is decreased by the active load modulation.

(Operation Example 1)

FIG. 5 illustrates an example of an operation of the communication system 1. (A) of FIG. 5 illustrates a waveform of the modulation control signal CTL1, (B) of FIG. 5 illustrates a waveform of the loop control signal CTL2, and (C) of FIG. 5 illustrates a waveform of the signal Sin. In this example, the communication device 20 performs the active load modulation during the modulation period P1. In this situation, the phase synchronizer 30 performs the open loop operation during the open loop operation period P2, which corresponds to the modulation period P1. Details of these operations are described below.

At and before timing t11, the communication controller 28 in the communication device 20 sets the modulation control signal CTL1 to the Low level, as illustrated in (A) of FIG. 5. This causes both the switches 23A and 23B to be set to the OFF state. Accordingly, the signal Sin corresponding to the carrier signal transmitted from the communication device 10 emerges at the second end of the coil 21, as illustrated in (C) of FIG. 5. The signal generator 29 sets the loop control signal CTL2 to the Low level on the basis of the modulation control signal CTL1, as illustrated in (B) of FIG. 5. The phase synchronizer 30 thereby performs the closed loop operation. That is, the phase synchronizer 30 generates the signal SIG30 on the basis of and in synchronization with the signal Sin.

Next, at timing t11, the communication controller 28 changes the modulation control signal CTL1 from the Low level to the High level, as illustrated in (A) of FIG. 5. This causes the switches 23A and 23B to be changed to the ON state, and the communication device 20 starts the active load modulation. Simultaneously, the signal generator 29 changes the loop control signal CTL2 from the Low level to the High level on the basis of the modulation control signal CTL1, as illustrated in (B) of FIG. 5. The phase synchronizer 30 thereby starts the open loop operation. The phase synchronizer 30 sets the switch 33 to the OFF state. In this situation, the loop filter 34 maintains the output voltage, and therefore the frequency of the signal SIG30 outputted from the phase synchronizer 30 is also maintained. In this example, the switches 23A and 23B are brought into the ON state, thereby causing the carrier signal transmitted from the communication device 10 and the signal SIG30 to be synthesized together. As a result, the amplitude of the signal Sin decreases with a predetermined time constant, as illustrated in (C) of FIG. 5. Then, the amplitude of the signal Sin is kept small until timing t12.

At timing t12, the communication controller 28 changes the modulation control signal CTL1 from the High level to the Low level, as illustrated in (A) of FIG. 5. This causes the switches 23A and 23B to be changed to the OFF state. As a result, the amplitude of the signal Sin increases with a predetermined time constant to come closer to the amplitude that has been before timing t11, as illustrated in (C) of FIG. 5.

Next, at timing t13, which is a timing after time corresponding to the shift amount Δt has passed from timing t12, the signal generator 29 changes the loop control signal CTL2 from the High level to the Low level, as illustrated in (B) of FIG. 5. The phase synchronizer 30 thereby starts the closed loop operation.

The communication system 1 repeats the above operations, thereby causing the communication device 20 to transmit the data D2 to the communication device 10.

As described above, the communication system 1 causes the phase synchronizer 30 to perform the open loop operation during the open loop operation period P2, which corresponds to the modulation period P1. This makes it possible to reduce the possibility of the phase synchronizer 30 malfunctioning.

In a case where the phase synchronizer 30 is configured to constantly perform the closed loop operation, for example, decreased amplitude of the signal Sin during the modulation period P1 may cause the phase synchronizer 30 to malfunction. Specifically, in a case where the amplitude of the signal Sin is extremely small, the PFD 31 in the phase synchronizer 30 fails to detect a transition of the signal Sin, and thus fails to perform the operation of comparing the phases. This causes the output voltage of the loop filter 34 to gradually deviate from a desired voltage. As a result, the frequency of the signal SIG30 deviates from a desired frequency. This may hinder the phase synchronizer 30 from returning the frequency of the signal SIG30 to the desired frequency, even when the amplitude of the signal Sin increases after the modulation period P1 has ended. Due to the frequency deviation, a frequency of a radio signal in use may deviate from a frequency band that is available in the near field communication. Eventually, it may become difficult to satisfy the specification for the near field communication.

On the other hand, the communication system 1 causes the phase synchronizer 30 to perform the open loop operation during the open loop operation period P2, which corresponds to the modulation period P1. Accordingly, even in a case where the amplitude of the signal Sin is decreased by the active load modulation, as illustrated in FIG. 5, the switch 33 in the phase synchronizer 30 is kept in the OFF state. Thus, the output voltage of the loop filter 34 is maintained. As a result, the frequency of the signal SIG30 is also maintained. Then, when starting the closed loop operation, the phase synchronizer 30 is able to synchronize the signals SIG30 with the signal Sin more securely. In this way, in the communication device 20, it becomes possible to reduce the possibility of the phase synchronizer 30 malfunctioning. Consequently, it is possible to enhance a quality of communication in the communication system 1.

In the communication system 1, the timing at which the open loop operation period P2 ends is set to be delayed from the timing at which the modulation period P1 ends. This also makes it possible to reduce the possibility of the phase synchronizer 30 malfunctioning.

That is, in a case where, for example, the phase synchronizer 30 is configured to selectively perform the open loop operation or the closed loop operation on the basis of the modulation control signal CTL1, without providing the signal generator 29, the phase synchronizer 30 starts the closed loop operation at timing t12. In this case, the phase synchronizer 30 may malfunction, because the amplitude of the signal Sin is still small right after timing t12.

In contrast, in the communication system 1, the timing at which the open loop operation period P2 ends is set to be delayed from the timing at which the modulation period P1 ends. In other words, the signal generator 29 delays the falling timing of the modulation control signal CTL1 by the shift amount Δt, thereby generating the loop control signal CTL2. In the communication system 1, as a result, the phase synchronizer 30 starts the closed loop operation at timing t13 at which the amplitude of the signal Sin has increased. This makes it possible to reduce the possibility of the phase synchronizer 30 malfunctioning. Consequently, it becomes possible to enhance a quality of communication in the communication system 1.

(Operation Example 2)

FIG. 6 illustrates another example of an operation of the communication system 1. (A) of FIG. 6 illustrates a waveform of the modulation control signal CTL1, (B) of FIG. 6 illustrates a waveform of the loop control signal CTL2, and (C) of FIG. 6 illustrates a waveform of the signal Sin.

As is the case with Operation Example 1 illustrated in FIG. 5, the communication controller 28 in the communication device 20 sets the modulation control signal CTL1 to the Low level before timing t21, as illustrated in (A) of FIG. 6. The signal generator 29 sets the loop control signal CTL2 to the Low level, as illustrated in (B) of FIG. 6. The signal Sin corresponding to the carrier signal transmitted from the communication device 10 emerges at the second end of the coil 21, as illustrated in (C) of FIG. 6.

At timing t21, the communication controller 28 changes the modulation control signal CTL1 from the Low level to the High level, as illustrated in (A) of FIG. 6. This causes the switches 23A and 23B to be changed to the ON state, and the communication device 20 starts the active load modulation. Simultaneously, the signal generator 29 changes the loop control signal CTL2 from the Low level to the High level on the basis of the modulation control signal CTL1, as illustrated in (B) of FIG. 6. The phase synchronizer 30 thereby starts the open loop operation. In this example, the switches 23A and 23B are brought into the ON state, thereby causing the carrier signal transmitted from the communication device 10 and the signal SIG30 to be synthesized together. As a result, the amplitude of the signal Sin increases with a predetermined time constant, as illustrated in (C) of FIG. 6. Then, the amplitude of the signal Sin is kept large until timing t22.

Next, at timing t22, the communication controller 28 changes the modulation control signal CTL1 from the High level to the Low level, as illustrated in (A) of FIG. 6. This causes the switches 23A and 23B to be changed to the OFF state. As a result, the amplitude of the signal Sin decreases with a predetermined time constant, as illustrated in (C) of FIG. 6. In this situation, the amplitude of the signal Sin transiently becomes extremely small, as indicated by a waveform W1, and then gradually increases to come closer to the amplitude that has been before timing t21.

Next, at timing t23, which is a timing after time corresponding to the shift amount Δt has passed from timing t22, the signal generator 29 changes the loop control signal CTL2 from the High level to the Low level, as illustrated in (B) of FIG. 6. The phase synchronizer 30 thereby starts the closed loop operation.

The communication system 1 repeats the above operations, thereby causing the communication device 20 to transmit the data D2 to the communication device 10.

In this example, the amplitude of the signal Sin increases during the modulation period P1, but decreases after the modulation period P1 has ended. In this situation, the amplitude of the signal Sin transiently becomes extremely small after the modulation period P1 has ended, as indicated by the waveform W1. In the communication system 1, the timing at which the open loop operation period P2 ends is set to timing t23, which is a timing after the waveform W1 has emerged. This prevents the phase synchronizer 30 from performing the closed loop operation within the period in which the amplitude of the signal Sin is extremely small. This makes it possible to reduce the possibility of the phase synchronizer 30 malfunctioning. Consequently, it is possible to enhance a quality of communication in the communication system 1.

(Concerning Communication Distance)

In the communication system 1, as described above, the signal generator 29 delays the falling timing of the modulation control signal CTL1 by the shift amount Δt, thereby generating the loop control signal CTL2. By increasing the shift amount Δt in the communication system 1, it is possible to increase its communication distance, as described below.

FIG. 7 illustrates a communication characteristic of the communication system 1. The horizontal axis represents the shift amount Δt, and the vertical axis represents the communication distance. In a case where the communication distance increases, an amplitude A of the carrier signal W1 illustrated in FIG. 4 decreases. Accordingly, the amplitude of the synthesized signal W3 varies depending on the communication distance. In a case where the communication distance increases in this manner, increasing the shift amount Δt makes it possible to reduce the possibility of the phase synchronizer 30 malfunctioning. In this manner, in the communication system 1, by increasing the shift amount Δt, it is possible to increase the communication distance.

[Effect]

In the present embodiment, as described above, the phase synchronizer performs the open loop operation during the open loop operation period corresponding to the load modulation. This makes it possible to reduce the possibility of the phase synchronizer malfunctioning. Consequently, it is possible to enhance a communication quality.

In the present embodiment, by setting the timing at which the open loop operation period ends to be delayed from the timing at which a modulation period ends, it is possible to reduce the possibility of the phase synchronizer malfunctioning, thus enhancing a communication quality.

The foregoing embodiment successfully increases a communication distance by reducing the possibility of the phase synchronizer malfunctioning.

MODIFICATION EXAMPLE 1-1

In the foregoing embodiment, the signal generator 29 delays the falling timing of the modulation control signal CTL1 by the shift amount Δt, thereby generating the loop control signal CTL2. This shift amount Δt may be configured to be variable, as illustrated in FIG. 8. A signal generator 29A according to the present modification example is able to set the falling timing of the loop control signal CTL2 to one of timings t31 to t38. Although the falling timing of the loop control signal CTL2 may be set to one of the eight timings in this example, the number of timings settable is not limited thereto. Alternatively, the falling timing of the loop control signal CTL2 may be set to one of seven or less timings, or to one of nine or more timings.

MODIFICATION EXAMPLE 1-2

Although the shift amount Δt is fixed in the foregoing embodiment, the shift amount Δt is not limited thereto. As an alternative example, the shift amount Δt may be changed depending on a communication state. Details of the present modification example are described below.

FIG. 9 illustrates an example of a configuration of a communication system 1B according to the present modification example. The communication system 1B includes a communication device 20B. The communication device 20B includes a demodulator 26B and a signal generator 29B.

The demodulator 26B performs a demodulation operation on the basis of the signal Sin at the second end of the coil 21. In addition, the demodulator 26B identifies a specification with which the communication device 10 is compliant, i.e., a communication specification SP. For example, this identification method may use a modulation degree of a signal transmitted from the communication device 10. That is, as described above, the communication device 10 may be compliant with one of various specifications, including Type A, Type B, FeliCa, and ISO015693 specifications. The modulator 13 in the communication device 10 uses a modulation degree corresponding to its compliant specification when performing the ASK modulation. Thus, the demodulator 26B is able to identify the specification with which the communication device 10 is compliant, i,e., the communication specification SP on the basis of the modulation degree of the signal transmitted from the communication device 10. However, the identification method is not limited thereto. Alternatively, the demodulator 26B may identify the communication specification SP on the basis of another feature of the signal, such as coding, a bit rate, or a subcarrier. For example, in a case where the data D1 transmitted by the communication device 10 contains information in accordance with the communication specification SP, the demodulator 26B may identify the communication specification SP on the basis of this information.

Similarly to the above signal generator 29A according to Modification Example 1-1, the signal generator 29B is configured to set the shift amount Δt to a variable value. This signal generator 29B sets the shift amount Δt on the basis of the communication specification SP.

FIG. 14 illustrates an example of an operation of the communication system 2B. In the communication system 2B, first, the communication device 10 transmits the data D1 to the communication device 20B. Then, the communication device 20B responds to this by transmitting the data D2 to the communication device 10. Details of this operation are described below.

At Step S1, the communication device 10 performs the ASK modulation to transmit the data D1 to the communication device 20B.

At Step S2, the demodulator 26B in the communication device 20B checks whether the data D1 is received. In a case where the demodulator 26B receives the data D1, the data generator 27 in the communication device 20B generates the data D2 in order to respond to the communication device 10. Then, the operation proceeds to step S3. In a case where the demodulator 26B fails to receive the data D1, the operation returns to step S1, and steps S1 and S2 are repeated until the data D1 is received.

At step S3, a demodulator 27B in the communication device 20B identifies the communication specification SP. At step S4, the signal generator 29B in the communication device 20B sets the shift amount Δt on the basis of the communication specification SP identified at step S3. Next, at step S5, the communication device 20B performs the active load modulation to transmit the data D2 to the communication device 10.

Through the above steps, this flow is completed.

In this manner, the communication system 2B sets the shift amount Δt on the basis of the communication specification SP. This makes it possible to enhance degree of flexibility when setting the shift amount Δt. Specifically, when the communication specification SP is a specification intended for long-distance communication, for example, the shift amount Δt may be set to a large value in order to increase a communication distance. Consequently, it is possible to enhance a quality of communication in the communication system 2B.

Although the shift amount Δt is set on the basis of the communication specification SP as described above, a method of setting the shift amount Δt is not limited thereto. As an alternative example, the shift amount Δt may be set on the basis of a bit rate BR. Next, a communication system 1C according to the present modification example is described.

As illustrated in FIG. 9, the communication system 1C includes a communication device 20C. The communication device 20C includes a demodulator 26C and a signal generator 29C. The demodulator 26C performs a demodulation operation on the basis of the signal Sin at the second end of the coil 21. In addition, the demodulator 26B identifies a bit rate BR, which is a bit rate at which the communication device 10 and the communication device 20C communicate with each other. In this identification method, for example, the demodulator 26C detects a frequency of a signal transmitted from the communication device 10, thus acquiring the bit rate BR. For example, in a case where data D1 transmitted from the communication device 10 contains information in accordance with the bit rate BR, the demodulator 26C may identify the bit rate BR on the basis of this information. The signal generator 29C sets the shift amount Δt on the basis of the bit rate BR.

FIG. 11 illustrates an example of an operation of the communication system 1C. At step S1, the communication device 10 performs the ASK modulation to transmit data D1 to the communication device 20C, as is the case with the communication system 1B illustrated in FIG. 10. At step S2, the demodulator 26C in the communication device 20C checks whether the data D1 have been received. Next, at step S13, the demodulator 26C in the communication device 20C identifies the bit rate BR. At step S14, the signal generator 29C in the communication device 20C sets the shift amount Δt on the basis of the bit rate BR identified at step S13. Next, at step S5, the communication device 20C performs the active load modulation to transmit data D2 to the communication device 10, as is the case with the communication system 1B illustrated in FIG. 10.

The communication system 2C sets the shift amount Δt on the basis of the bit rate BR. This makes it possible to enhance degree of flexibility when setting the shift amount Δt. Specifically, when the bit rate BR becomes higher, for example, the shift amount Δt may preferably be set to a smaller value, because each transmission symbol is handled within a short period of time. Consequently, it is possible to enhance a quality of communication in the communication system 2C.

Although the shift amount Δt is set on the basis of the bit rate BR as described above, a method of setting the shift amount Δt is not limited thereto. As an alternative example, the shift amount Δt may be set on the basis of the voltage amplitude of the signal Sin. Next, a communication system 1D according to the present modification example is described.

FIG. 12 illustrates an example of a configuration of the communication system 1D. The communication system 1D includes a communication device 20D. The communication device 20D includes an amplitude detector 25D and a signal generator 29D. The amplitude detector 25D detects an amplitude value Vsw of the signal Sin on the basis of the signal Sin. The signal generator 29D sets a shift amount Δt on the basis of the amplitude value Vsw.

FIG. 13 illustrates an example of an operation of the communication system 1D. At step S1, the communication device 10 performs the ASK modulation to transmit data D1 to the communication device 20D, as is the case with the communication system 1B illustrated in FIG. 10. At step S2, the demodulator 26 in the communication device 20D checks whether the data D1 have been received. Next, at step S23, the amplitude detector 25D in the communication device 20D detects the amplitude value Vsw of the signal Sin.

Next, at step S24, the signal generator 29D in the communication device 20D compares the amplitude value Vsw detected at step S23 with a preset threshold Vth. In a case where the amplitude value Vsw is equal to or more than the threshold Vth (Vsw≥Vth), the signal generator 29D sets the shift amount Δt to a shift amount Δt1 at step S25. In a case where the amplitude value Vsw is less than the threshold Vth (Vsw<Vth), the signal generator 29D sets the shift amount Δt to a shift amount Δt2 at step S26.

Next, at step S5, the communication device 20D performs the active load modulation to transmit data D2 to the communication device 10, as is the case with the communication system 1B illustrated in FIG. 10.

In this manner, the communication system 2D sets the shift amount Δt on the basis of the amplitude value Vsw of the signal Sin. This makes it possible to enhance degree of flexibility when setting the shift amount Δt. Specifically, when the amplitude value Vsw of the signal Sin become smaller, for example, the shift amount Δt may preferably be set to a larger value, because a communication distance between the communication device 10 and the communication device 20D is long. Consequently, it is possible to enhance a quality of communication in the communication system 2D.

Although the communication system 2D compares the amplitude value Vsw of the signal Sin with a single threshold Vth, the comparison method is not limited thereto. The comparison may also be made using a plurality of thresholds. This makes it is possible to finely set the shift amount Δt. When the amplitude value Vsw of the signal Sin is sufficiently large, the shift amount Δt may be set to zero.

Alternatively, the shift amount Δt may be set on the basis of two or more of the communication specification SP, the bit rate BR, and the amplitude value Vsw of the signal Sin.

<2. Second Embodiment>

Next, a communication system 2 according to a second embodiment is described. A signal generator in the present embodiment operates in a different manner from the foregoing first embodiment. It is to be noted that same components as those of the communication system 1 according to the foregoing first embodiment are denoted by same reference numerals, and description thereof is omitted as appropriate.

As illustrated in FIG. 1, the communication system 2 includes a communication device 40. The communication device 40 includes a signal generator 49. The signal generator 49 generates the loop control signal CTL2 on the basis of the modulation control signal CTL1, and then supplies the loop control signal CTL2 to the phase synchronizer 30.

FIG. 14 illustrates an example of an operation of the signal generator 49. (A) of FIG. 14 illustrates a waveform of the modulation control signal CTL1, and (B) of FIG. 14 illustrates a waveform of the loop control signal CTL2. When the modulation control signal CTL1 rises at timing t41, the signal generator 49 changes, in response to this rise, the loop control signal CTL2 from a Low level to a High level at timing t42 at which predetermined time has passed from the rising timing t41. When the modulation control signal CTL1 falls at timing t43, the signal generator 49 changes, in response to this fall, the loop control signal CTL2 from the High level to the Low level at timing t44 at which the predetermined time has passed from the falling timing t43. In other words, the signal generator 49 delays the rising timing and the falling timing of the modulation control signal CTL1 by a shift amount $\Delta t$, thereby generating the loop control signal CTL2.

FIG. 15 illustrates an example of an operation of the communication system 2. (A) of FIG. 15 illustrates the waveform of the modulation control signal CTL1, (B) of FIG. 15 illustrates the waveform of the loop control signal CTL2, and (C) of FIG. 15 illustrates a waveform of a signal Sin. FIG. 15 corresponds to Operation Example 1, illustrated in FIG. 5, according to the first embodiment.

At timing t51, the communication controller 28 changes the modulation control signal CTL1 from the Low level to the High level, as illustrated in (A) of FIG. 15. This causes the switches 23A and 23B to be changed to the ON state, and the communication device 40 starts the active load modulation. As a result, the carrier signal transmitted from the communication device 10 and the signal SIG30 are synthesized together, and the amplitude of the signal Sin decreases with a predetermined time constant, as illustrated in (C) of FIG. 15. The amplitude of the signal Sin is kept small until timing t53.

Next, at timing t52 at which time corresponding to the shift amount $\Delta t$ has passed from timing t51, the signal generator 49 changes the loop control signal CTL2 from the Low level to the High level, as illustrated in (B) of FIG. 15. This causes the phase synchronizer 30 to start the open loop operation. The switch 33 in the phase synchronizer 30 is set to the OFF state. In this situation, the loop filter 34 maintains an output voltage, and thus a frequency of the signal SIG30 outputted from the phase synchronizer 30 is maintained.

Next, at timing t53, the communication controller 28 changes the modulation control signal CTL1 from the High level to the Low level, as illustrated in (A) of FIG. 15. This causes the switches 23A and 23B to be changed to the OFF state. As a result, the amplitude of the signal Sin increases with a predetermined time constant to come closer to the amplitude that has been before timing t51, as illustrated in (C) of FIG. 15.

Next, at timing t54 at which time corresponding to the shift amount $\Delta t$ has passed from timing t53, the signal generator 49 changes the loop control signal CTL2 from the High level to the Low level, as illustrated in (B) of FIG. 15. The phase synchronizer 30 thereby starts the closed loop operation.

The communication system 2 repeats the above operations, thereby causing the communication device 40 to transmit the data D2 to the communication device 10.

In the communication system 2, as described above, the timing at which the open loop operation period P2 starts is set to be delayed from the timing at which the modulation period P1 starts. This enables the phase synchronizer 30 to perform the closed loop operation during the period between timing t51 and t52. That is, the amplitude of the signal Sin gradually decreases in this period, but the amplitude is still large enough for the phase synchronizer 30 to be able to perform the closed loop operation. Therefore, the communication system 2 causes the phase synchronizer 30 to operate during this period. This makes it possible to extend a period of time during which the phase synchronizer 30 performs the closed loop operation. This enables the signal SIG30 to be synchronized with the signal Sin more securely. Consequently, it is possible to enhance a quality of communication in the communication system 2.

In the present embodiment, as described above, the timing at which the open loop operation period starts is set to be delayed from the timing at which the modulation period starts. Thus, it is possible to extend the period of time during which the phase synchronizer performs the closed loop operation, thus making it possible to enhance a communication quality. Other effects are similar to those of the foregoing first embodiment.

MODIFICATION EXAMPLE 2-1

In the foregoing embodiment, the signal generator 49 delays the rising timing and the falling timing of the modulation control signal CTL1 by the shift amount $\Delta t$, thereby generating the loop control signal CTL2. This shift amount $\Delta t$ may be configured to be variable, as illustrated in FIG. 16. A signal generator 49A according to the present modification example is able to set the rising timing of the loop control signal CTL2 to one of timings t61 to 64, and to set the falling timing of the loop control signal CTL2 to one of timings t71 to t74. Although each of the rising timing and the falling timing of the loop control signal CTL2 is able to be set to one of the four timings in this example, the number of timings settable is not limited thereto. Alternatively, each of the rising timing and the falling timing of the loop control signal CTL2 may be set to one of three or less timings or to one of five or more timings.

The technology has been described using some embodiments and modification examples. However, the technology is not limited to these embodiments and modification examples, and may be modified in a variety of ways.

In each second embodiment, a signal generator 48 delays the rising timing and the falling timing of the modulation control signal CTL1 by the shift amount $\Delta t$, thereby generating the loop control signal CTL2. However, the method of generating the loop control signal CTL2 is not limited thereto. As an alternative example, the signal generator 49 may delay the rising timing of the modulation control signal CTL1 by a shift amount $\Delta ta$, and may delay the falling timing of the modulation control signal CTL1 by a shift amount $\Delta tb$, thereby generating the loop control signal CTL2. In this manner, the present modification example makes it possible to enhance the flexibility of an operation by differently setting the shift amount $\Delta ta$ during the rising and the shift amount $\Delta tb$ during the falling.

It is to be noted that the effects described herein are merely examples and are not limitative, and may further include other effects.

It is to be noted that the technology may have the following configurations.

(1) A communication device including:
a phase synchronizer that generates a second signal on a basis of a first signal received from a communication partner by selectively performing one of a closed loop operation and an open loop operation;
a modulator that is able to modulate the first signal on a basis of the second signal; and
a controller that controls operations of the phase synchronizer and the modulator.

(2) The communication device according to (1), in which
the controller causes the modulator to modulate the first signal during a modulation period, and
the controller causes the phase synchronizer to perform the open loop operation during an open loop operation period, the open loop operation period corresponding to the modulation period.

(3) The communication device according to (2), in which a timing at which the modulation period ends is within the open loop operation period.

(4) The communication device according to (2) or (3), in which
the controller generates a modulation control signal, the modulation control signal being at a first logic level during the modulation period and at a second logic level during a period other than the modulation period,
the controller generates a loop control signal on a basis of the modulation control signal, the loop control signal being at a third logic level during the open loop operation period and at a fourth logic level during a period other than the open loop operation period,
the modulator modulates the first signal on the basis of the modulation control signal, and
the phase synchronizer selectively performs one of the closed loop operation and the open loop operation on a basis of the loop control signal.

(5) The communication device according to (4), in which the controller generates the loop control signal by delaying a first transition timing from the first logic level of the modulation control signal to the second logic level of the modulation control signal.

(6) The communication device according to (5), in which the controller determines an amount by which the first transition timing is delayed, on a basis of a method of communicating with the communication partner.

(7) The communication device according to (5) or (6), in which the controller determines an amount by which the first transition timing is delayed, on a basis of a communication rate of communication with the communication partner.

(8) The communication device according to any one of (5) to (7), in which the controller determines an amount by which the first transition timing is delayed, on a basis of a signal amplitude of the first signal.

(9) The communication device according to any one of (5) to (8), in which the controller further generates the loop control signal by delaying a second transition timing from the second logic level of the modulation control signal to the first logic level of the modulation control signal.

(10) The communication device according to any one of (1) to (9), in which
the modulator has a switch,
the phase synchronizer receives the first signal from the communication partner via a coil, and
the switch is brought into an ON state to supply the second signal to the coil.

(11) A communication method including:
causing a phase synchronizer to selectively perform one of a closed loop operation and an open loop operation to generate a second signal on a basis of a first signal received from a communication partner, and
causing a modulator to modulate the first signal on a basis of the second signal.

(12) A communication system including:
a first communication device that transmits a first signal; and
a second communication device,
the second communication device including
a phase synchronizer that generates a second signal on a basis of the first signal received from the first communication device by selectively performing one of a closed loop operation and an open loop operation,
a modulator that is able to modulate the first signal on a basis of the second signal, and
a controller that controls operations of the phase synchronizer and the modulator.

This application is based upon and claims the benefit of priority of the Japanese Patent Application No. 2015-138445 filed with the Japan Patent Office on Jul. 10, 2015, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A communication device comprising:
a phase synchronizer that generates a second signal on a basis of a first signal received from a communication partner by selectively performing one of a closed loop operation and an open loop operation;
a modulator that is able to modulate the first signal on a basis of the second signal; and
a controller that controls operations of the phase synchronizer and the modulator,
wherein:
the controller causes the modulator to modulate the first signal during a modulation period, and
the controller causes the phase synchronizer to perform the open loop operation during an open loop operation period, the open loop operation period corresponding to the modulation period, and
a timing at which the modulation period ends is within the open loop operation period.

2. The communication device according to claim 1, wherein
the modulator has a switch,
the phase synchronizer receives the first signal from the communication partner via a coil, and
the switch is brought into an ON state to supply the second signal to the coil.

3. A communication device comprising:
a phase synchronizer that generates a second signal on a basis of a first signal received from a communication partner by selectively performing one of a closed loop operation and an open loop operation;
a modulator that is able to modulate the first signal on a basis of the second signal; and
a controller that controls operations of the phase synchronizer and the modulator,
wherein:
the controller causes the modulator to modulate the first signal during a modulation period, and
the controller causes the phase synchronizer to perform the open loop operation during an open loop operation period, the open loop operation period corresponding to the modulation period,
the controller generates a modulation control signal, the modulation control signal being at a first logic level during the modulation period and at a second logic level during a period other than the modulation period,
the controller generates a loop control signal on a basis of the modulation control signal, the loop control signal being at a third logic level during the open loop operation period and at a fourth logic level during a period other than the open loop operation period,
the modulator modulates the first signal on the basis of the modulation control signal, and
the phase synchronizer selectively performs one of the closed loop operation and the open loop operation on a basis of the loop control signal.

4. The communication device according to claim 3, wherein the controller generates the loop control signal by delaying a first transition timing from the first logic level of the modulation control signal to the second logic level of the modulation control signal.

5. The communication device according to claim 4, wherein the controller determines an amount by which the first transition timing is delayed, on a basis of a method of communicating with the communication partner.

6. The communication device according to claim 4, wherein the controller determines an amount by which the first transition timing is delayed, on a basis of a communication rate of communication with the communication partner.

7. The communication device according to claim 4, wherein the controller determines an amount by which the first transition timing is delayed, on a basis of a signal amplitude of the first signal.

8. The communication device according to claim 4, wherein the controller further generates the loop control signal by delaying a second transition timing from the second logic level of the modulation control signal to the first logic level of the modulation control signal.

* * * * *